United States Patent
Nelson et al.

(10) Patent No.: US 11,313,764 B2
(45) Date of Patent: Apr. 26, 2022

(54) PARTICULATE MATTER SENSOR

(71) Applicant: DELPHI TECHNOLOGIES IP LIMITED, St. Michael (BB)

(72) Inventors: Charles S. Nelson, Fenton, MI (US); Gopinath Reddy Penamalli, Karnataka (IN); Mark R. McClanahan, Goodrich, MI (US)

(73) Assignee: Delphi Technologies IP Limited, St. Michael (BB)

( * ) Notice: Subject to any disclaimer, the term of this patent is extended or adjusted under 35 U.S.C. 154(b) by 357 days.

(21) Appl. No.: 16/400,375

(22) Filed: May 1, 2019

(65) Prior Publication Data

US 2020/0348208 A1 Nov. 5, 2020

(51) Int. Cl.
*G01M 15/10* (2006.01)
*G01N 27/12* (2006.01)

(52) U.S. Cl.
CPC .......... *G01M 15/102* (2013.01); *G01N 27/12* (2013.01)

(58) Field of Classification Search
CPC ................................................. G01M 15/102
See application file for complete search history.

(56) References Cited

U.S. PATENT DOCUMENTS

| | | | |
|---|---|---|---|
| 8,225,648 B2 | 7/2012 | Nelson | |
| 9,032,779 B2 * | 5/2015 | Otsubo | G01N 27/4077 73/23.31 |
| 2006/0289308 A1 | 12/2006 | Shaddock et al. | |
| 2008/0202943 A1 | 8/2008 | Guenschel et al. | |
| 2014/0338424 A1 | 11/2014 | Kume et al. | |
| 2015/0192509 A1 * | 7/2015 | Brueck | G01N 33/0009 73/23.31 |
| 2015/0355066 A1 | 12/2015 | Zhang | |
| 2016/0076919 A1 * | 3/2016 | Murakami | G01D 11/245 73/431 |
| 2016/0252372 A1 | 9/2016 | Rentschler et al. | |
| 2017/0058746 A1 | 3/2017 | Zhang | |
| 2017/0074148 A1 | 3/2017 | Zhang | |
| 2017/0226916 A1 | 8/2017 | Zhang | |
| 2017/0261417 A1 | 9/2017 | Zhang | |
| 2018/0313780 A1 | 11/2018 | Weber et al. | |

FOREIGN PATENT DOCUMENTS

DE 102006046837 A1 4/2008
DE 102008041038 A1 2/2010

* cited by examiner

*Primary Examiner* — Lisa M Caputo
*Assistant Examiner* — Alex T Devito
(74) *Attorney, Agent, or Firm* — Joshua M. Haines (57) ABSTRACT

A particulate matter sensor includes a sensing element with a first electrode and a second electrode, an inner shield with the sensing element disposed therein, and an outer shield with the inner shield disposed therein. The inner shield includes a first portion with an inner shield inlet and a second portion which is smaller in diameter that the first portion such that the first and second electrodes are within the second portion. The outer shield includes an outer shield inlet which communicates exhaust gases to the inner shield inlet.

20 Claims, 5 Drawing Sheets

PARTICULATE MATTER SENSOR

TECHNICAL FIELD OF INVENTION

The present invention relates to particulate matter sensors for sensing the amount of particulate matter or soot in the exhaust conduit of an internal combustion engine; and more particularly to a shield arrangement for such particulate matter sensors.

BACKGROUND OF INVENTION

Knowing the amount of particulate matter or soot present in the exhaust stream of a diesel engine is important for determining the operational state of an exhaust gas treatment device, for example, a diesel particulate filter. A particulate matter sensor is often placed in the exhaust conduit in order to sense the amount of particulate matter present in the exhaust stream. The amount of particulate matter sensed by the particulate matter sensor may then be used, for example, to determine if the diesel particulate filter has failed and is therefore emitting a greater amount of particulate matter than is allowed.

A typical particulate matter sensor uses a simple resistive device as the sensing element. The sensing element typically includes a non-conductive substrate, most often alumina or zirconia, and two conductive electrodes that may be made of a precious metal. The two electrodes may be formed in a pattern with inter-digitized fingers that maximizes the perimeter between the two electrodes. When the sensing element is disposed in the exhaust stream of a diesel engine, particulate matter will deposit thereupon and cause a high resistance short between the electrodes, thereby lowering the resistance between the two electrodes. The more particulate matter that is allowed to collect on the sensing element, the more the resistance between the two electrodes will decrease. The sensing element may be provided with a heater on the side opposite the electrodes in order to clean soot off of the electrodes when desired.

It is known that liquid water may be present in the exhaust stream and that liquid water may carry materials that are damaging to the two electrodes. Consequently, if the liquid water is allowed to reach the two electrodes of the sensing element, the two electrodes may become coated, shorted, or masked with contaminants which can lengthen the response time or reliability of output of the particulate matter sensor. In order to protect the sensing element of particulate matter sensors, various shield arrangements have been proposed. One shield arrangement is shown in German patent application publication number DE 10 2006 046 837 A1 to Kamp et al. where the shield arrangement includes an inner shield and an outer shield. However, the arrangement of Kamp et al. requires the inner shield to be spaced away a significant distance from the two electrodes which allows a significant portion of the flow of the exhaust gases passing through the particulate matter sensor be an ineffective distance from the sensing element for collecting particulate matter thereon. Furthermore, the close proximity of the inner shield and the outer shield limits the flow of exhaust gases into the outer shield, thereby limiting the overall flow of exhaust gases through the particulate matter sensor. Also furthermore, the arrangement of Kamp et al. is also susceptible to liquid water reaching the sensing element by way of respective outlets of the inner shield and the outer shield due to their close proximity to each other and also due to the outlet of the inner shield being much larger than the outlet of the outer shield.

What is needed is a particulate matter sensor which minimizes or eliminates one or more of the aforementioned shortfalls and that can effectively minimize liquid water from reaching the electrodes of the sensing element.

SUMMARY OF THE INVENTION

Briefly described, a particulate matter sensor for sensing particulate matter present in exhaust gasses flowing from an upstream end to a downstream end of an exhaust conduit for an internal combustion engine includes a sensing element with a first electrode and a second electrode, the first electrode and the second electrode being configured to extend into the exhaust conduit and further configured to provide a signal indicative of an amount of particulate matter collected thereon; an inner shield extending along an axis from an inner shield first end to an inner shield second end, the inner shield having an inner shield wall which circumferentially surrounds the axis, thereby defining an inner shield chamber therewithin such that the first electrode and the second electrode are located within the inner shield chamber, the inner shield also having an inner shield inlet which is proximal to the inner shield first end and which passes through the inner shield wall in a direction which is traverse to the axis, the inner shield also having and an inner shield outlet which is distal from the inner shield first end; and an outer shield extending along the axis, the outer shield having an outer shield wall which circumferentially surrounds the axis, thereby defining an outer shield chamber therewithin such that the inner shield is located within the outer shield chamber and such that exhaust gases are supplied to the inner shield inlet from the outer shield chamber, the outer shield wall having an outer shield wall inlet portion which is traverse to the axis and which includes an outer shield inlet extending therethrough. The inner shield wall includes an inner shield wall upper portion surrounding the axis and an inner shield wall lower portion surrounding the axis, the inner shield wall upper portion extending from the inner shield first end toward the inner shield wall lower portion such that the inner shield wall upper portion has an inner shield first outside diameter, and the inner shield wall lower portion extending away from the inner shield wall upper portion toward the inner shield second end such that the inner shield wall lower portion has an inner shield second outside diameter which is less than the inner shield first outside diameter. The inner shield inlet extends radially through the inner shield wall upper portion. The first electrode and the second electrode are circumferentially surrounded by the inner shield wall lower portion. The particulate matter sensor with the inner shield and the outer shield as disclosed herein provides enhanced ability to prevent liquid water from reaching the first electrode and the second electrode while providing desired exposure of the first electrode and the second electrode to exhaust gases for sensing levels of particulate matter contained in the exhaust gases.

BRIEF DESCRIPTION OF DRAWINGS

This invention will be further described with reference to the accompanying drawings in which.

DETAILED DESCRIPTION OF INVENTION

Figure 1:
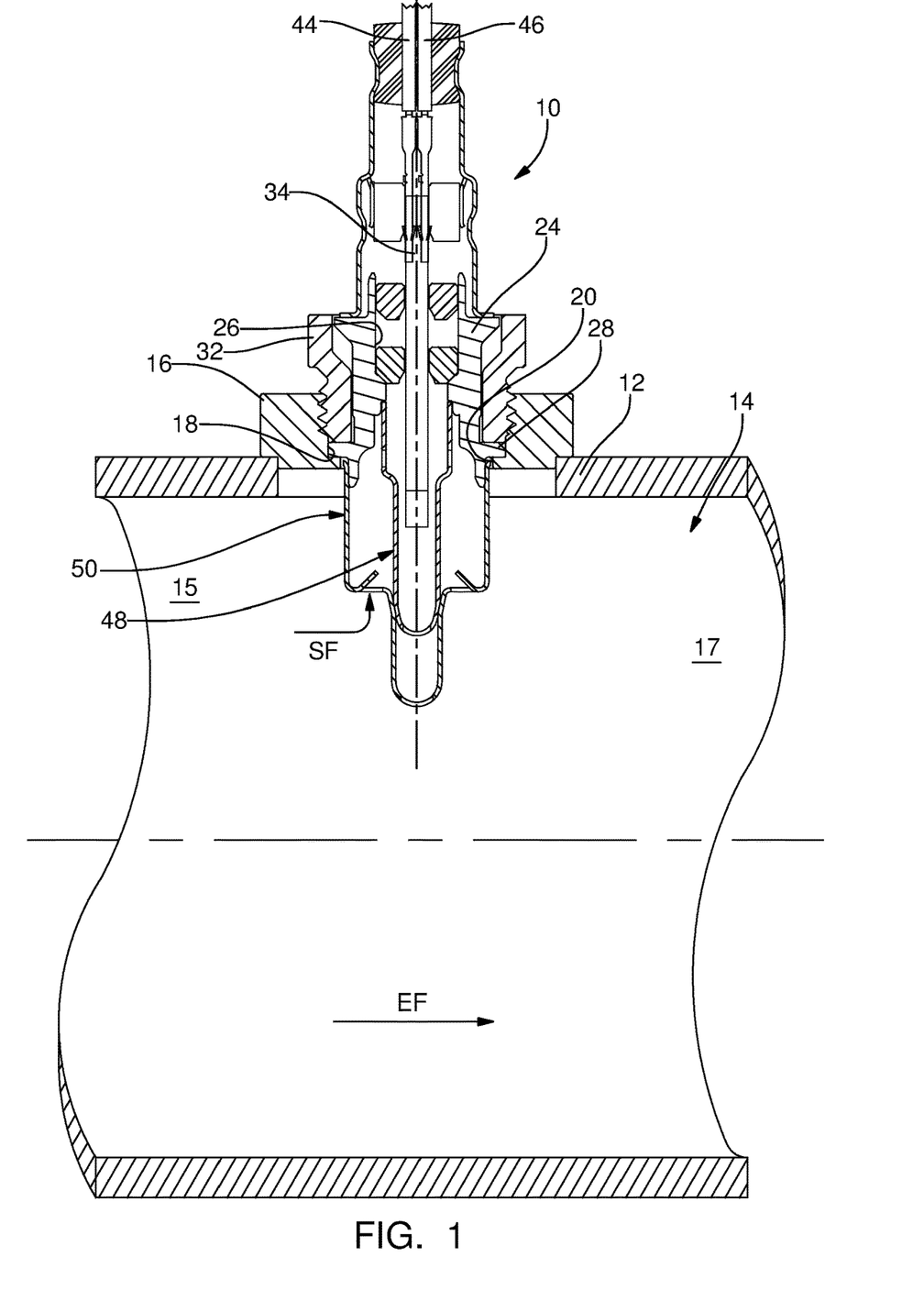
FIG. 1 is an axial cross-section of a particulate matter sensor in accordance with the present disclosure installed in an exhaust conduit.

In accordance with a preferred embodiment of this invention and referring initially to FIG. 1, a particulate matter sensor 10 is shown installed through an exhaust conduit wall 12 of an exhaust conduit 14 having an upstream end 15 for receiving exhaust gases from an internal combustion engine (not shown) and a downstream end 17 for communicating exhaust gases out of exhaust conduit 14 to the atmosphere. Exhaust conduit wall 12 includes a mounting boss 16 extending therethrough for installing particulate matter sensor 10 therein. Mounting boss 16 includes a stepped bore 18 for receiving particulate matter sensor 10 therein. Mounting boss 16 also includes a through bore 20 extending from the bottom of stepped bore 18 to allow particulate matter sensor 10 to extend into the interior of exhaust conduit 14.

Particulate matter sensor 10 includes a housing 24 with a housing longitudinal bore 26 extending therethrough. Housing 24 includes a radial flange 28 extending radially outward therefrom such that radial flange 28 axially positions particulate matter sensor 10 within stepped bore 18 of mounting boss 16.

A retainer nut 32 is threadably engaged with stepped bore 18 for retaining particulate matter sensor 10 to mounting boss 16. Radial flange 28 is axially captured between retainer nut 32 and stepped bore 18 such that when retainer nut 32 is tightened, particulate matter sensor 10 is securely held to mounting boss 16. In an alternative arrangement, retainer nut 32 may be omitted and housing 24 may directly threadably engage stepped bore 18 for retaining particulate matter sensor 10 to mounting boss 16.

Figure 5:
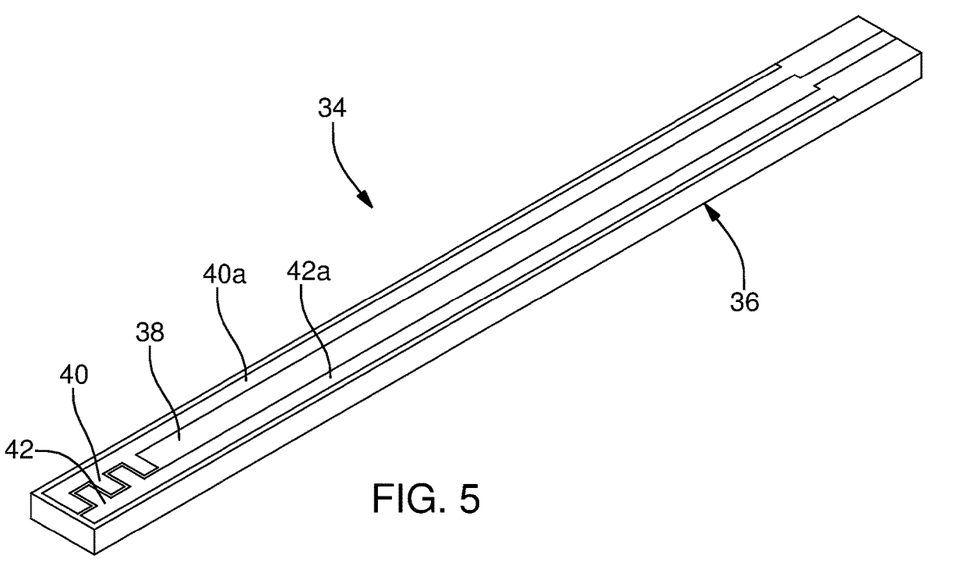
FIG. 5 is an isometric view of a sensing element of the particulate matter sensor.

Now referring to FIGS. 1 and 5, a sensing element 34 is disposed in housing longitudinal bore 26 and extends axially from particulate matter sensor 10 radially into exhaust conduit 14. Sensing element 34 also preferably extends radially outside exhaust conduit 14. Sensing element 34 includes a non-conductive substrate 36 with a sensing face 38. A first electrode 40 and a second electrode 42 are disposed on sensing face 38 such that first electrode 40 and second electrode 42 are located within exhaust conduit 14 and are arranged to maximize the perimeter there between, for example, by forming a pattern of inter-digitized fingers although many different patterns may be used. Although not shown, a heating element may be disposed on the face opposite sensing face 38 in order to clean soot off first electrode 40 and second electrode 42 when desired. A first electrode lead 40a is located on sensing face 38 in electrical communication with first electrode 40 such that first electrode lead 40a extends outside of exhaust conduit 14 where first electrode lead 40a is electrically connected to a first wire 44 which extends to an engine control module (not shown). Similarly, a second electrode lead 42a is located on sensing face 38 in electrical communication with second electrode 42 in electrical communication with second electrode 42 such that second electrode lead 42a extends outside of exhaust conduit 14 where second electrode lead 42a is electrically connected to a second wire 46 which extends to the engine control module. First wire 44 and second wire 46 provide a signal to the engine control module which is indicative of the amount of particulate matter that has collected and bridged across first electrode 40 and second electrode 42.

Now referring to FIGS. 1-4, an inner shield 48 and an outer shield 50 will now be described. Inner shield 48 and outer shield 50 work collectively to provide protection to sensing element 34 from undesirable contaminates in the exhaust stream, for example liquid water, while providing desired flow of exhaust gases containing particulate matter to be sensed by first electrode 40 and second electrode 42.

Figure 2:
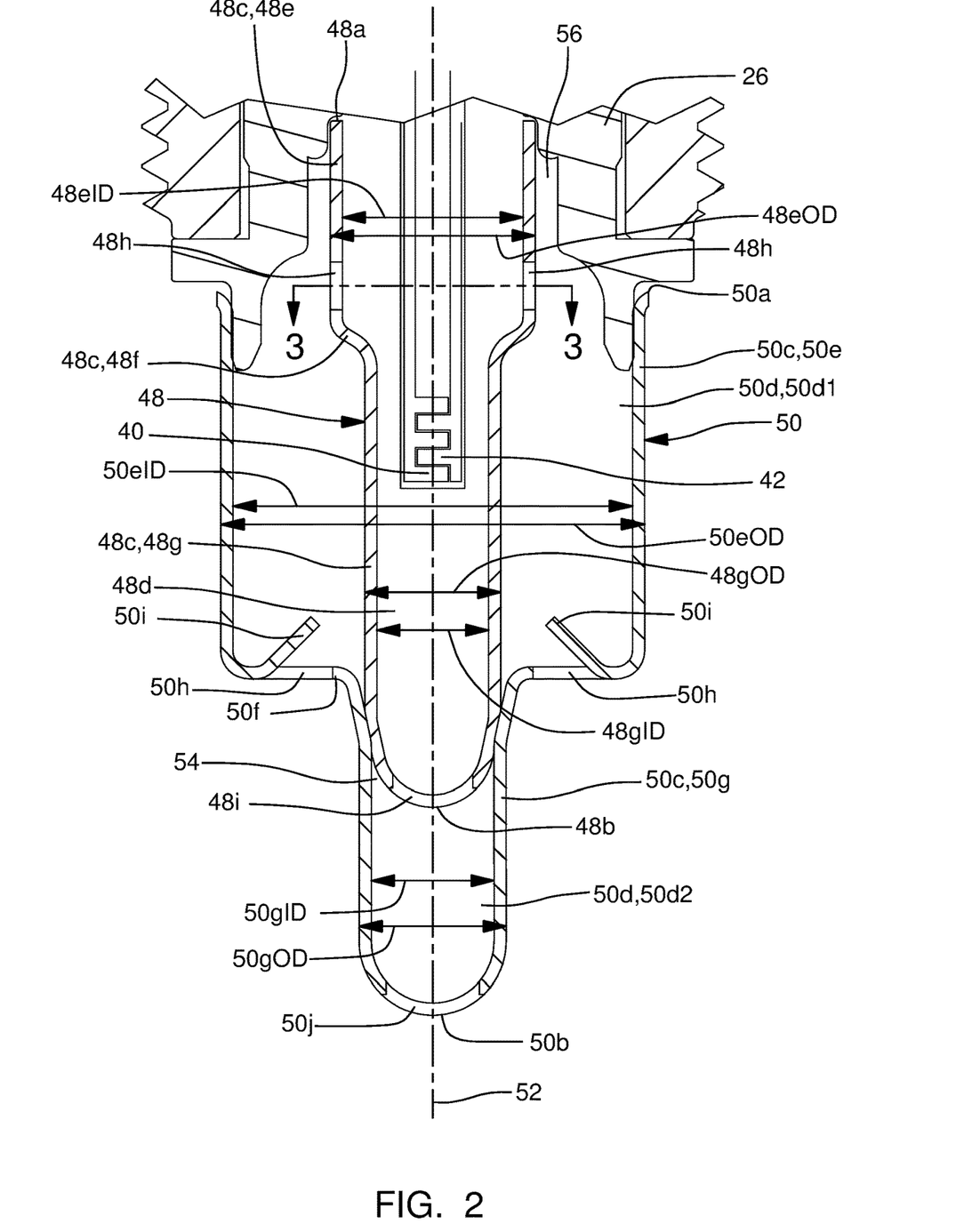
FIG. 2 is an enlarged portion of the particulate matter sensor.
Figure 3:
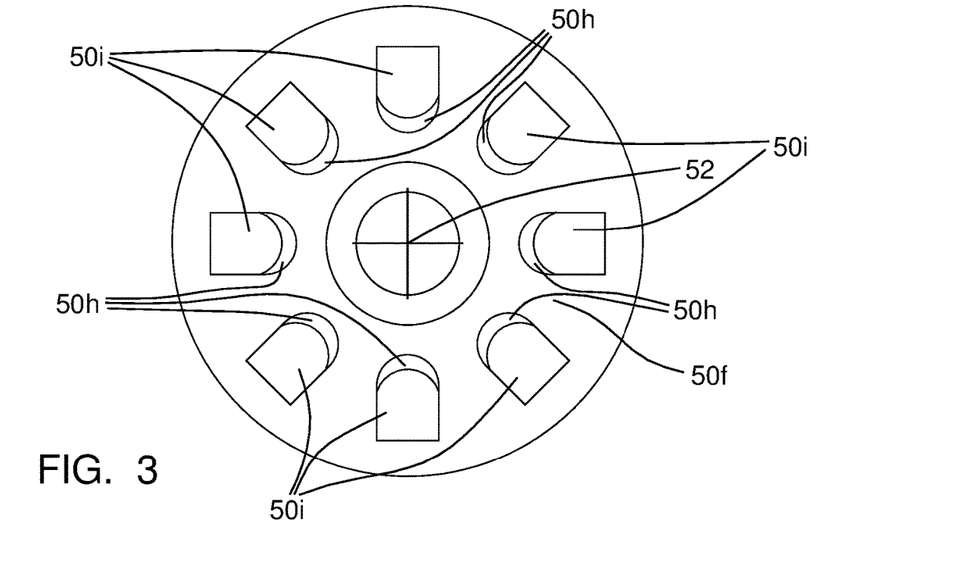
FIG. 3 is an end view of the particulate matter sensor.

Outer shield 50 is tubular and extends from an outer shield first end 50a to an outer shield second end 50b along an axis 52 such that outer shield 50 comprises an outer shield wall 50c which circumferentially surrounds axis 52, thereby defining an outer shield chamber 50d therewithin. Outer shield first end 50a is proximal to housing 24 and is fixed thereto, by way of non-limiting example only, by one or more of interference fit, welding, crimping, and the like. Outer shield wall 50c includes an outer shield wall upper portion 50e which is cylindrical and centered about axis 52 such that outer shield wall upper portion 50e has an outer shield first inside diameter 50eID and an outer shield first outside diameter 50eOD. Outer shield wall upper portion 50e extends from outer shield first end 50a to an outer shield wall inlet portion 50f which is traverse to axis 52 and which is preferably perpendicular to axis 52 such that outer shield wall inlet portion 50f extends radially inward from outer shield wall upper portion 50e, and in this way, outer shield wall inlet portion 50f is annular in shape. Outer shield wall inlet portion 50f is delimited radially inward by an outer shield wall lower portion 50g which is cylindrical and centered about axis 52 and which extends axially therefrom in a direction opposite from outer shield wall upper portion 50e and terminates at outer shield second end 50b. As illustrated in the figures, outer shield wall inlet portion 50f joins outer shield wall upper portion 50e and outer shield wall lower portion 50g. Outer shield wall lower portion 50g has an outer shield second inside diameter 50gID and an outer shield second outside diameter 50gOD such that outer shield second inside diameter 50gID is less than outer shield first inside diameter 50eID and such that outer shield second outside diameter 50gOD is less than outer shield first outside diameter 50gID.

An outer shield inlet, illustrated as a plurality of outer shield inlet apertures 50h, extends through outer shield wall inlet portion 50f in order to allow exhaust gases to enter outer shield chamber 50d such that outer shield inlet apertures 50h are arranged in a polar array about axis 52. Each outer shield inlet aperture 50h includes a respective inlet passage deflector 50i which is inclined relative to axis 52 such that each inlet passage deflector 50i is located within outer shield chamber 50d and such that each inlet passage deflector 50i is aligned with a respective one of outer shield inlet apertures 50h in a direction parallel to axis 52. Inlet passage deflectors 50i are preferably integrally formed with outer shield wall inlet portion 50f by being a remnant of material from punching outer shield wall inlet portion 50f to form outer shield inlet apertures 50h. However, instead of severing this remnant from outer shield 50, each inlet passage deflector 50i remains attached to outer shield wall inlet portion 50f along one edge. As a result, the outer periphery of each inlet passage deflector 50i matches an inner periphery of its respective outer shield inlet aperture 50h. Finally, in order to allow exhaust gases to exit from outer shield 50, outer shield wall lower portion 50g includes an outer shield outlet 50*j* at outer shield second end 50*b* which is circular and centered about axis 52 such that outer shield outlet 50*j* is smaller in diameter than outer shield second inside diameter 50*g*ID.

Figure 4:
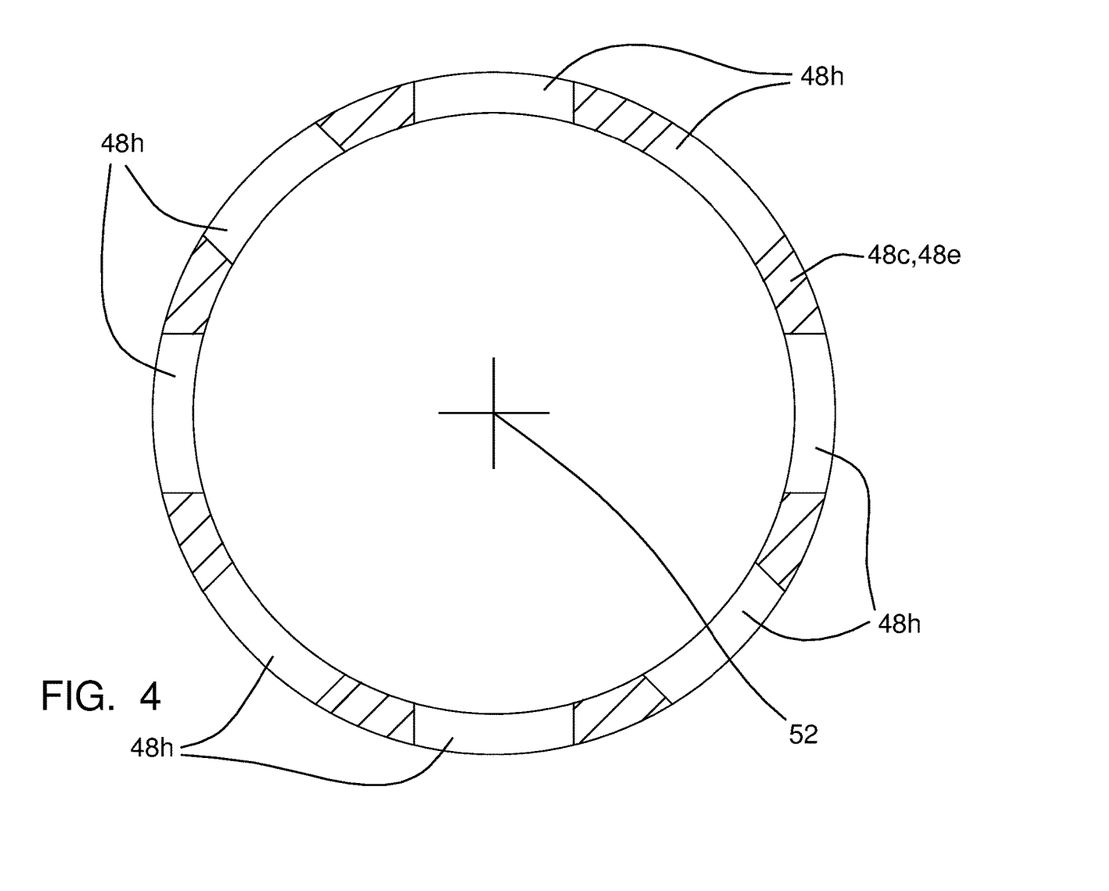
FIG. 4 is a radial cross-sectional view of an inner shield of the particulate matter sensor taken through section line 4-4 of FIG. 2.

Inner shield 48 is tubular and extends from an inner shield first end 48*a* to an inner shield second end 48*b* along axis 52 such that inner shield 48 comprises an inner shield wall 48*c* which circumferentially surrounds axis 52, thereby defining an inner shield chamber 48*d* therewithin. First electrode 40 and second electrode 42 of sensing element 34 are located within inner shield chamber 48*d*. Inner shield first end 48*a* is proximal to housing 24 and is fixed thereto, by way of non-limiting example only, by one or more of interference fit, welding, crimping, and the like. Inner shield wall 48*c* includes an inner shield wall upper portion 48*e* which is cylindrical and centered about axis 52 such that inner shield wall upper portion 48*e* has an inner shield first inside diameter 48*e*ID and an inner shield first outside diameter 48*e*OD. Inner shield wall upper portion 48*e* extends from inner shield first end 48*a* to an inner shield wall transition portion 48*f* which is traverse to axis 52 such that inner shield wall transition portion 48*f* extends inward from inner shield wall upper portion 48*e* toward axis 52. Inner shield wall transition portion 48*f* is delimited inward by an inner shield wall lower portion 48*g* which is cylindrical and centered about axis 52 and which extends axially therefrom in a direction opposite from inner shield wall upper portion 48*e* and terminates at inner shield second end 48*b*. Inner shield wall lower portion 48*g* has an inner shield second inside diameter 48*g*ID and an inner shield second outside diameter 48*g*OD such that inner shield second inside diameter 48*g*ID is less than inner shield first inside diameter 48*e*ID and such that inner shield second outside diameter 48*g*OD is less than inner shield first outside diameter 48*g*ID.

An inner shield inlet proximal to inner shield first end 48*a*, illustrated as a plurality of inner shield inlet apertures 48*h*, extends through inner shield wall upper portion 48*e* in order to allow exhaust gases to enter inner shield chamber 48*d* from outer shield chamber 50*d* such that inner shield inlet apertures 48*h* extend through inner shield wall upper portion 48*e* in a direction which is traverse to axis 52 such that inner shield inlet apertures 48*h* extend radially through inner shield wall upper portion 48*e*. While eight inner shield inlet apertures 48*h* have been illustrated herein which are equally spaced, it should be understood that a lesser quantity or a greater quantity may be provided which may or may not be equally spaced. However, in order to allow particulate matter sensor 10 to be insensitive to installation orientation about axis 52 in exhaust conduit 14, it is preferable that each one of inner shield inlet apertures 48*h* is spaced no more than 90° about axis 52 relative to consecutive ones of inner shield inlet apertures 48*h* about the periphery of inner shield 48. In order to allow exhaust gases to exit from inner shield 48, inner shield wall lower portion 48*g* includes an inner shield outlet 48*i*, distal from inner shield first end 48*a*, and located at inner shield second end 48*b*. Inner shield outlet 48*i* is circular and centered about axis 52 such that inner shield outlet 48*i* is smaller in diameter than inner shield second inside diameter 48*g*OD. Inner shield outlet 48*i* is also smaller or equal in diameter to outer shield outlet 50*j*. Exhaust gases which exit from inner shield outlet 48*i* are passed to the portion of outer shield chamber 50*d* which is surrounded by outer shield wall lower portion 50*g*. First electrode 40 and second electrode 42 of sensing element 34 are positioned within inner shield chamber 48*d* such that first electrode 40 and second electrode 42 are entirely located axially between inner shield inlet apertures 48*h* and inner shield outlet 48*i* and such that first electrode 40 and second electrode 42 are circumferentially surrounded by inner shield wall lower portion 48*g*. Furthermore, it should be noted that first electrode 40 and second electrode 42 are not circumferentially surrounded by inner shield wall upper portion 48*e*. Also furthermore, it should be noted that first electrode 40 and second electrode 42 are not circumferentially surrounded by inner shield inlet apertures 48*h*. Placement of first electrode 40 and second electrode 42 within inner shield wall lower portion 48*g* allows for more of the exhaust gases to be close to first electrode 40 and second electrode 42 which is desirable for sensing of particulate matter.

An outer periphery of inner shield wall lower portion 48*g* sealingly engages and circumferentially engages an inner periphery of outer shield wall lower portion 50*g*, thereby separating outer shield chamber 50*d* into an outer shield upper chamber 50*d*1 which is proximal to outer shield first end 50*a* and an outer shield lower chamber 50*d*2 which is distal from outer shield first end 50*a*. Consequently, exhaust gases passing from outer shield inlet apertures 50*h* to outer shield outlet 50*j* must pass through outer shield upper chamber 50*d*1, inner shield chamber 48*d* and outer shield lower chamber 50*d*2 in sequential order. Inner shield wall lower portion 48*g* gradually reduced in diameter within outer shield wall lower portion 50*g* such that an annular recess 54 is formed radially between inner shield wall lower portion 48*g* and outer shield wall lower portion 50*g* at inner shield second end 48*b*. Furthermore, inner shield outlet 48*i* and outer shield outlet 50*j* are spaced apart along axis 52 by at least the diameter of inner shield outlet 48*i*. Annular recess 54 together with this axial spacing between inner shield outlet 48*i* and outer shield outlet 50*j* and also together with inner shield outlet 48*i* being less than or equal in diameter to outer shield outlet 50*j* prevents liquid water that may accumulate on the inner periphery of outer shield wall lower portion 50*g* from migrating into inner shield chamber 48*d*.

Outer shield wall upper portion 50*e* circumferentially surrounds a portion of inner shield wall lower portion 48*g* such that outer shield first inside diameter 50*e*ID is preferably at least two times inner shield second outside diameter 48*g*OD. This relationship between outer shield first inside diameter 50*e*ID and inner shield second outside diameter 48*g*OD promotes swirling of the exhaust gases which promotes dropping of liquid water that may enter outer shield upper chamber 50*d*1, thereby minimizing the possibility of this liquid water from passing to inner shield chamber 48*d*. This relationship between outer shield first inside diameter 50*e*ID and inner shield second outside diameter 48*g*OD also allows outer shield inlet apertures 50*h* to be maximized in size to allow desired flow through particulate matter sensor 10.

Another feature which minimizes the likelihood of liquid water from entering inner shield chamber 48*d* is an upper annular recess 56 which is formed radially between inner shield wall upper portion 48*e* and housing longitudinal bore 26 and which is located above inner shield inlet apertures 48*h* such that inner shield inlet apertures 48*h* are located between upper annular recess 56 and outer shield inlet apertures 50*h*. Upper annular recess 56 may be annular in shape as illustrated herein. Water that may be propelled upward in outer shield upper chamber 50*d*1 can be carried by momentum into upper annular recess 56 rather than follow the exhaust gases through inner shield inlet apertures 48*h*.

Figure 2A:
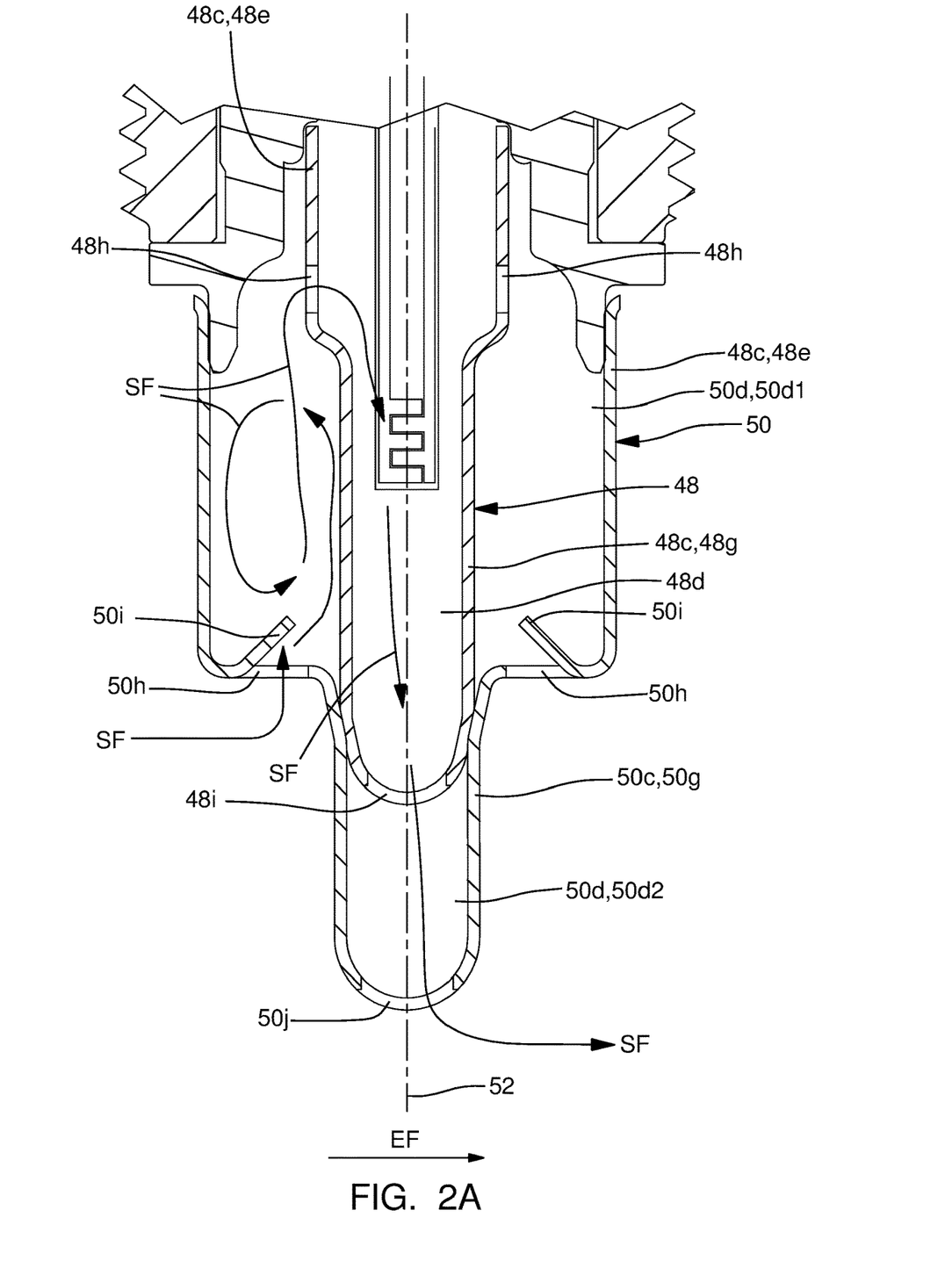
FIG. 2A is the view of FIG. 2, now shown to include flow arrows to illustrate the path of exhaust gases through the particulate matter sensor.

Without being bound by any particular theory, in operation, and referring to FIGS. 1 and 2A, exhaust gases flow through exhaust conduit 14 in the direction of arrow EF from upstream end 15 to downstream end 17. A portion of the exhaust gas flow, sensing flow indicated as arrow SF, enters outer shield upper chamber 50d1 of outer shield 50 through outer shield inlet apertures 50h such that sensing flow SF must turn approximately 90° relative to exhaust flow EF in order to pass through outer shield inlet apertures 50h, and consequently, any liquid water in the exhaust gases must make an approximately 90° which is a difficult path for liquid water to take. After passing through outer shield inlet apertures 50h, sensing flow SF encounters inlet passage deflectors 50i which helps to introduce turbulence to the exhaust gases. The turbulence together with the relationship between inner shield second outside diameter 48gOD and outer shield first inside diameter 50eID promotes swirl of liquid water that may be present, thereby promoting dropping of the water which minimizes the likelihood of water entering inner shield chamber 48d. Next, the sensing flow enters inner shield chamber 48d through inner shield inlet apertures 48h. Since inner shield inlet apertures 48h extend radially through inner shield wall upper portion 48e, sensing flow SF must make another approximately 90° turn in order to enter inner shield chamber 48d, thereby minimizing the likelihood of liquid water from entering inner shield chamber 48d. Furthermore, since first electrode 40 and second electrode 42 are located axially between inner shield inlet apertures 48h and inner shield outlet 48i and since inner shield inlet apertures 48h are not radially aligned with first electrode 40 and second electrode 42, liquid water cannot directly impinge first electrode 40 and second electrode 42. Sensing flow SF passes over first electrode 40 and second electrode 42 where particulate matter can deposit to be sensed. After passing over first electrode 40 and second electrode 42, sensing flow SF passes through inner shield outlet 48i where it passes to outer shield lower chamber 50d2 and finally passes through outer shield outlet 50j where sensing flow SF rejoins exhaust flow EF. It should be noted that arrows SF have been provided as an example only, and that portions of the sensing flow may follow other paths which include, but are not limited to, passing through other outer shield inlet apertures 50h and other inner shield inlet apertures 48h.

Particulate matter sensor 10 with inner shield 48 and outer shield 50 as described herein provides enhanced ability to prevent liquid water from reaching first electrode 40 and second electrode 42 while providing desired exposure of first electrode 40 and second electrode 42 to exhaust gases for sensing levels of particulate matter contained in the exhaust gases. Particulate matter sensor 10 achieves this objective while maintaining an overall packaging size which allows particulate matter sensor 10 to be accommodated by mounting boss 16 which is conventionally sized.

While this invention has been described in terms of preferred embodiments thereof, it is not intended to be so limited, but rather only to the extent set forth in the claims that follow.

We claim:

1. A particulate matter sensor for sensing particulate matter present in exhaust gasses flowing from an upstream end to a downstream end of an exhaust conduit for an internal combustion engine, said particulate matter sensor comprising:
    a sensing element with a first electrode and a second electrode, said first electrode and said second electrode being configured to extend into said exhaust conduit and further configured to provide a signal indicative of an amount of particulate matter collected thereon;
    an inner shield extending along an axis from an inner shield first end to an inner shield second end, said inner shield having an inner shield wall which circumferentially surrounds said axis, thereby defining an inner shield chamber therewithin such that said first electrode and said second electrode are located within said inner shield chamber, said inner shield also having an inner shield inlet which is proximal to said inner shield first end and which passes through said inner shield wall in a direction which is traverse to said axis, said inner shield also having and an inner shield outlet which is distal from said inner shield first end; and
    an outer shield extending along said axis, said outer shield having an outer shield wall which circumferentially surrounds said axis, thereby defining an outer shield chamber therewithin such that said inner shield is located within said outer shield chamber and such that exhaust gases are supplied to said inner shield inlet from said outer shield chamber, said outer shield wall having an outer shield wall inlet portion which is traverse to said axis and which includes an outer shield inlet extending therethrough;
    wherein said inner shield wall includes an inner shield wall upper portion surrounding said axis and an inner shield wall lower portion surrounding said axis, said inner shield wall upper portion extending from said inner shield first end toward said inner shield wall lower portion such that said inner shield wall upper portion has an inner shield first outside diameter, and said inner shield wall lower portion extending away from said inner shield wall upper portion toward said inner shield second end such that said inner shield wall lower portion has an inner shield second outside diameter which is less than said inner shield first outside diameter;
    wherein said inner shield inlet extends radially through said inner shield wall upper portion; and
    wherein said first electrode and said second electrode are circumferentially surrounded by said inner shield wall lower portion.

2. A particulate matter sensor as in claim 1, wherein said first electrode and said second electrode are entirely located axially between said inner shield inlet and said inner shield outlet.

3. A particulate matter sensor as in claim 1, wherein said inner shield inlet comprises a plurality of inner shield inlet apertures extending radially through said inner shield wall upper portion.

4. A particulate matter sensor as in claim 3, wherein each one of said plurality of inner shield inlet apertures is spaced apart no more than 90° about said axis relative to consecutive ones of said plurality of inner shield inlet apertures about a periphery of said inner shield.

5. A particulate matter sensor as in claim 1, wherein said first electrode and said second electrode are not circumferentially surrounded by said inner shield wall upper portion.

6. A particulate matter sensor as in claim 1, wherein said outer shield wall includes an outer shield wall upper portion which circumferentially surrounds said inner shield wall lower portion, said outer shield wall upper portion having an outer shield first inside diameter which is at least two times said inner shield second outside diameter.

7. A particulate matter sensor as in claim 6, wherein said outer shield includes an outer shield wall lower portion surrounding said axis and extending away from said outer shield wall upper portion such that said outer shield wall inlet portion joins said outer shield wall upper portion and said outer shield wall lower portion.

8. A particulate matter sensor as in claim 7, wherein said outer shield wall lower portion has an outer shield second inside diameter which is less than said outer shield first inside diameter.

9. A particulate matter sensor as in claim 8, wherein an outer periphery of said inner shield wall lower portion circumferentially engages an inner periphery of said outer shield wall lower portion.

10. A particulate matter sensor as in claim 9, wherein an annular recess is located radially between said inner shield wall lower portion and said outer shield wall lower portion at said inner shield second end.

11. A particulate matter sensor as in claim 8, wherein said inner shield outlet is circumferentially surrounded by said outer shield wall lower portion.

12. A particulate matter sensor as in claim 7, wherein:
said outer shield wall lower portion includes an outer shield outlet which allows exhaust gases to exit said outer shield, said outer shield outlet being centered about said axis and having an outer shield outlet diameter; and
said inner shield outlet has an inner shield outlet diameter which is less than or equal to said outer shield outlet diameter.

13. A particulate matter sensor as in claim 12, wherein said inner shield outlet and said outer shield outlet are spaced apart from each other along said axis by a distance that is greater than or equal to said inner shield outlet diameter.

14. A particulate matter sensor as in claim 12, wherein said axis passes through both said inner shield outlet and said outer shield outlet.

15. A particulate matter sensor as in claim 12, wherein said inner shield outlet and said outer shield outlet are coaxial.

16. A particulate matter sensor as in claim 1, wherein said outer shield inlet comprises a plurality of outer shield inlet apertures arranged in a polar array about said axis such that each of said plurality of outer shield inlet apertures extends through said outer shield wall inlet portion.

17. A particulate matter sensor as in claim 16, wherein said outer shield includes a plurality of inlet passage deflectors located within said outer shield chamber which are inclined relative to said axis and such that each one of said plurality of inlet passage deflectors is aligned with a respective one of said plurality of outer shield inlet apertures in a direction parallel to said axis.

18. A particulate matter sensor as in claim 17, wherein an outer periphery of each of said plurality of inlet passage deflectors matches an inner periphery of its respective one of said plurality of outer shield inlet apertures.

19. A particulate matter sensor as in claim 1, wherein said particulate matter sensor further comprises a housing and an upper annular recess is formed radially between said inner shield wall upper portion and said housing such that said inner shield inlet is located between said upper annular recess and said outer shield inlet and such that said upper annular recess is located radially inward from said housing and radially outward from said inner shield wall upper portion.

20. A particulate matter sensor as in claim 19, wherein said upper annular recess is an open recess which provides a space for water to enter during operation.

* * * * *